US006835764B2

(12) United States Patent
Leckey et al.

(10) Patent No.: US 6,835,764 B2
(45) Date of Patent: Dec. 28, 2004

(54) BIODEGRADABLE COMPOSITION AND PRODUCTS PREPARED THEREFROM

(75) Inventors: Richard Anthony Leckey, Toowoomba (AU); Allan Leon Sydney Hill, Toowoomba (AU); Alan John Reichle, Gowrie Mountain (AU)

(73) Assignee: Bio-Deg. Moulding Pty Ltd, Toowoomba (AU)

( * ) Notice: Subject to any disclaimer, the term of this patent is extended or adjusted under 35 U.S.C. 154(b) by 159 days.

(21) Appl. No.: 10/312,567

(22) PCT Filed: Jul. 13, 2001

(86) PCT No.: PCT/AU01/00853

§ 371 (c)(1),
(2), (4) Date: Jan. 13, 2003

(87) PCT Pub. No.: WO02/06023

PCT Pub. Date: Jan. 24, 2002

(65) Prior Publication Data

US 2004/0028927 A1 Feb. 12, 2004

(30) Foreign Application Priority Data

Jul. 14, 2000 (AU) .............................................. PQ8805

(51) Int. Cl.[7] ................................................ C08K 11/00

(52) U.S. Cl. ........................... 524/15; 524/13; 524/451; 524/494; 523/223

(58) Field of Search ............................ 524/13, 15, 451, 524/494; 523/223

(56) References Cited

U.S. PATENT DOCUMENTS 4,638,022 A * 1/1987 Cope ........................... 524/15
5,964,933 A 10/1999 Nakamura

FOREIGN PATENT DOCUMENTS

| | | |
|---|---|---|
| AU | 75492/96 | 9/1997 |
| JP | 90-211983/28 | 5/1990 |
| JP | 4146953 | 2/1992 |
| JP | 94-164139/20 | 4/1994 |
| JP | 06172624 | 6/1994 |
| JP | 95-204529/27 | 5/1995 |
| JP | 8269888 | 10/1996 |
| JP | 10036685 | 2/1998 |
| JP | 98-501813/43 | 8/1998 |
| JP | 10273582 | 10/1998 |
| JP | 2000006228 | 1/2000 |
| JP | 2000160034 | 6/2000 |

* cited by examiner

*Primary Examiner*—Kriellion A. Sanders
(74) *Attorney, Agent, or Firm*—Hoffman, Wasson & Gitler, PC

(57) ABSTRACT

This invention relates to a composition which can be used to form a wood substitute. The composition comprises 30 to 70% (volume by volume) of a high molecular weight aliphatic polyester and comminuted cellulose-containing plant material, wherein the aliphatic polyester comprises 1,4-butanediol condensed with adipic acid and/or succinic acid. The invention also provides for producing wood substitute from the composition. The wood substitute has characteristics of natural wood. Articles made from the wood substitute are biodegradable and do not give off toxic fumes when combusted.

22 Claims, No Drawings

BIODEGRADABLE COMPOSITION AND PRODUCTS PREPARED THEREFROM

TECHNICAL FIELD

The invention relates to a synthetic material that can be used as a wood substitute. In particular, the invention relates to a polymer/cellulose composition that can be moulded into a wood-like material.

BACKGROUND ART

Throughout history wood, or timber, has been one of the most abundantly utilised natural materials. Wood has served humankind—and continues to serve humankind—as a construction material, as a raw material for other materials such as paper, and as a fuel. Indeed, there is hardly a human activity where wood does not play some role.

Humankind's utilisation of wood, coupled with destruction of forests, has resulted in a shortage or total lack of some types of wood. Continued utilisation will more than likely result in almost all wood being in short supply. Consequently, there is considerable emphasis on more efficient use of wood in construction. For example, rather than traditional processing of trees into lumber, it is now common to "chip" a whole tree, with the resulting chips being used to manufacture wood panels and the like. Wood panels manufactured from wood chips are commonly referred to as "chip board" and require a binder to maintain the integrity of the panel.

A disadvantage of manufactured wood products such as chip board is that toxic fumes can be released when the material is burnt. Furthermore, not all manufactured wood products are readily biodegradable or biodegradation results in toxic residue.

It would therefore be desirable to have available a wood substitute that has substantially the same properties as natural wood in terms of strength and durability yet can be biodegraded without leaving toxic residues and combusted without emitting toxic fumes.

SUMMARY OF THE INVENTION

The object of the invention is to provide a wood substitute that retains the necessary properties of natural wood for construction purposes and which can be biodegraded to non toxic residue or can be combusted without emission of toxic fumes.

Other objects of the invention are to provide a composition for producing the wood substitute and to provide a process for producing the wood substitute.

In one embodiment, the invention provides a composition for forming a wood substitute, the composition comprising 30 to 70% (volume by volume) of a high molecular weight aliphatic polyester and the balance a comminuted cellulose-containing plant material, wherein said aliphatic polyester comprises 1,4-butanediol condensed with adipic acid and/or succinic acid.

In another embodiment, the invention provides a process for producing a wood substitute, the process comprising the steps of:

a) heating a composition comprising 30 to 70% (volume by volume) of a high molecular weight aliphatic polyester and the balance a comminuted cellulose-containing plant material at a temperature of 110 to 180° C. to provide a flowable material, wherein said aliphatic polyester comprises 1,4-butanediol condensed with adipic acid and/or succinic acid;

b) forming said heated material from step (a) into a desired product; and c) allowing said product to cool to at least ambient temperature.

In other embodiments of the invention, there are provided wood substitute products formed using the composition of the invention.

The present inventors have found that a material having all of the desirable properties of wood can be prepared from a composition comprising comminuted plant material in combination with particular high molecular weight aliphatic polyesters as a binder. Products formed from the composition are biodegradable and combustion does not give off toxic fumes.

A key component of the composition is the high molecular weight aliphatic polyester. By "high molecular weight", it is meant that the polyester has a number average molecular weight (Mn) of at least 5,000 and weight average molecular weight (Mw) of at least 30,000. Typically, the molecular weight (Mw) of the aliphatic polyester falls within the range of 40,000 to 300,000.

As indicated in the above definitions of embodiments of the invention, the aliphatic polyester comprises 1,4-butanediol and aliphatic dicarboxylic acids such as succinic acid and adipic acid. These polyesters and processes for their preparation are described in U.S. Pat. No. 5,310,782 and U.S. Pat. No. 5,436,056, the contents of which are incorporated herein by cross reference. The properties of the polyesters—including their biodegradability—are discussed in an article by Takashi Fujimaki published in *Polymer Degradation and Stability*, Vol. 59, pp. 209–214 (1998), the entire content of which is also incorporated herein by cross reference. The polyesters the subjects of the foregoing publications are manufactured by Showa Highpolymer Co., Ltd of Tokyo, Japan and are sold under the trade name "Bionolle". Two series of polyesters are commercially available, these being a polybutylene succinate polyester coded #1000 series and a polybutylene succinate adipate copolymer coded #3000 series.

The cellulose-containing plant material of the composition according to the invention can be any suitable plant material including, but not limited to the epidermis and cortex of plants, and other material such as seed coat. Specific examples of suitable plant material are: nutshells such as pecan nutshells, peanut shells and the like, and other cellulose-containing waste material such as sugar cane bagasse.

The plant material is comminuted using any procedure known to those of skill in the art. The size of comminuted particles can range from a fine powder up to about 5 mm in size.

Compositions can include other additives for visual effect and weight minimisation. For example, compounds such as fly-ash, talc, pigments and the like can be added for visual effect while micro-balloons, hollow glass spheres, foaming agents and the like can be included in compositions for weight minimisation. The additives can comprise 2 to 5% of the volume of the final composition without affecting biodegradability.

In one application, the wood substitute is used as a plant container such as a seedling tray or pot plant. In this application, the wood substitute composition can be combined with plant growth compounds (either synthetic or natural) and/or plant fibre. Plant containers made from the wood substitute composition of the invention have the advantage that they are rigid like plastic plant containers yet are readily biodegradable. They are also suitable for automated planting.

Blending of the aliphatic polyester and the comminuted plant material can be done using any suitable method. For example, the raw polymer, the comminuted plant material, and any other additives, can be blended using a twin screw extruder. The extrusion process is typically carried out over a temperature range of 160 to 240° C. in which range the polyester is liquified. The molten output of the extruder can then be compacted and formed into convenient volumes for formation into wood substitute articles.

Alternatively, the wood substitute composition can be prepared by pregrinding the polyester material—which is typically available as pellets—by a cryogenic process using liquid nitrogen. The powdered polyester can then be combined with the comminuted plant material and any other additives using a machine suitable for mixing dry materials. After mixing the composition so formed can be divided into suitable volumes for ultimate use in preparing wood substitute articles.

Compositions according to the first embodiment defined above can be stored prior to processing into a wood substitute product provided that storage is in a desiccated atmosphere.

In the process of producing the wood substitute, the composition—which can be considered to be similar to a thermosetting plastics material—is heated sufficiently to give a polymeric whole. The formation step of the process described above, step (b), can be by any of the methods known to those of skill in the art. For example, compression, vacuum, injection, extrusion or rotation moulding can be used to form the product. The product can also be a sheet for subsequent form moulding or can be powdered for subsequent rotation moulding.

The cooling in step (c) of the process can be to less than ambient temperature if desired. In such an instance, cooling is mechanically aided. Mechanically aided cooling can also be applied to rapidly lower the temperature of the product to ambient or lower as desired.

The wood substitute product of the invention can be used to form articles normally made of wood such as furniture components, architectural mouldings, building construction elements including panels, decorative articles, and household or office articles such as ash trays, storage containers, trays and the like. The wood substitute can be formed by an extrusion process into sheets of corrugated material suitable for packaging. Such panels or solid panels of the wood substitute can also be used for formwork in building construction.

The wood substitute is particularly suited for the production of funerary articles such as coffins or caskets, urns, wall plaques and coffin ornaments. The suitability of the material for the production of funerary articles lies in it being readily biodegradable and combustible without emission of toxic fumes.

Having broadly described the invention, non-limiting examples of compositions and application of the process will now be provided.

BEST MODE AND OTHER MODES OF CARRYING OUT THE INVENTION

EXAMPLE 1

In this example, we describe a composition according to the invention.

A total of 402 g of Bionolle #3020 from Showa Highpolymer Co. Ltd., was heated until liquified then 125 g of comminuted pecan nutshells added and a homogeneous mixture formed by hand mixing. The pecan nutshells had been comminuted using an electric blender to produce a powder. The composition so formed was a reddish-brown coloured plasticine-like paste.

EXAMPLE 2

In this example, we described the production of a simple bowl from the composition described in Example 1.

A total of 500 g of the composition from the preceding example was immediately compression moulded into bowls of about 70 mm in diameter and the moulded products cooled under running water to room temperature. The product had the appearance, feel and weight characteristics of timber yet was found to be stronger than Australian hardwood. The product was found to be biodegradable when buried or exposed to soil and other compost material. When combusted, the product did not give off toxic fumes or release any detectable harmful products into the environment.

EXAMPLE 3

Equal volumes of Bionolle #1903 from Showa Highpolymer and comminuted pecan nutshells were mixed at 160 to 220° C. using a twin screw extruder. The pecan nutshells had been comminuted using a milling and sizing process to produce particles ranging in size from 0.25 to 2.0 mm. The composition so formed retained the rich chocolate-brown colouring of the pecan nutshells.

It was found that the colour of the composition could be varied by the choice of pecan nutshell or could be darkened by scorching the mixture and/or adding colouring agents.

Portions of 750 g of the composition were immediately compression moulded into bowls of 200 mm diameter using a stainless steel mould. The procedure used was essentially as described above in Example 2. Articles so produced had the same properties as the Example 2 articles.

EXAMPLE 4

In this example we describe the production of sheet formation using a similar composition as described in Example 3.

A total or 375 g of Bionolle #1903 was added to a functioning preheated (220° C.) twin roller mill and after melt was achieved 250 g of comminuted pecan nut-shell was added giving a 60/40 ratio of the compound. On removal from the mill in sheet form the compound was found to display properties that would suit mass production. The MFI (melt flow index) of the compound increased to 4.8 being higher than pure Bionolle #1903 which has an MFI of 4.5. This characteristic makes this compound suitable for injection moulding, compression moulding, dough moulding, extrusion moulding and sheet formation using readily available plastics manufacturing machinery.

EXAMPLE 5

In this example, we describe the preparation of biodegradable self-fertilising pots for plants. The composition from which the pots were formed consisted of the following on a weight by weight basis:

60% polyester (a Bionolle from the #1000 series)

10% animal manure

2% fertiliser

3% plant fibre

25% comminuted plant material

The components of the composition were blended as described above and the composition moulded into suitably shaped and sized pots.

The plant fibre used was sugar cane waste (such as bagasse), hemp-like products and other fibrous matter. The comminuted plant material was pecan nutshell or saw dust.

Pots prepared from the foregoing composition can be used for the growth of any plant. In experiments conducted with pots having a 1 to 2 mm thick wall and buried under high composting conditions, degradation of pots was complete in about 4 months.

EXAMPLE 6

Characteristics of wood substitute compositions according to the invention and wood substitute prepared therefrom were determined. The following compositions were prepared from Bionolle #3020 and comminuted pecan nutshells or cedar wood essentially as described above in Example 1. The compositions were:

70% Bionolle/30% pecan nut filler (70B/30PF)

60% Bionolle/40% pecan nut filler (60B/40PF)

50% Bionolle/50% pecan nut filler (50B/50PF)

50% Bionolle/50% cedar wood filler (50B/50CF)

The compositions were used to form dog bone-shaped test pieces by injection moulding. Each test piece had a length of 150 mm, a width at its ends of 20 mm, and a thickness of 4 mm. The width of the test piece at its narrowest portion was 10 mm.

For comparative purposes, standard chipboard panelling was formed into identically sized test pieces.

a) Tensile characteristics

Test pieces were strained at a constant rate of 5 mm/min until failure using Instron 5584 test equipment. The resulting stress over the entire strain range was recorded and from this each composition's mechanical properties calculated. The results of this test are presented in Table 1.

TABLE 1

Tensile Test Results

| Material | Strain at Break (%) | Tensile Stress at Max. Load (Mpa) | Young's Modulus (Mpa) |
|---|---|---|---|
| 70B/30PF | 4.35 | 14.27 | 649.97 |
| 60B/40PF | 2.17 | 12.59 | 1066.19 |
| 50B/50PF | 2.63 | 14.38 | 897.45 |
| 50B/50CF | 3.27 | 30.02 | 1559.75 |
| Chipboard | 0.86 | 3981.47 | — |

The results show that wood substitute prepared from compositions of the invention have a tensile strength superior to that of at least chipboard.

b) Rockwell Hardness Characteristics

A 12.7 mm ball nosed indenter with a 60 kg major load was used. The depth of penetration of the ball into a test piece was recorded and from this a standard Rockwell hardness number (alpha) on the R scale determined. The following results were obtained:

| Test Material | Rockwell Hardness Number |
|---|---|
| 70B/30PF | 110 |
| 60B/40PF | 124 |
| 50B/50PF | 112 |
| 50B/50CF | 138 |
| Chipboard | −14 |

The results show that wood substitute according to the invention has a hardness vastly superior to chipboard.

c) Flowability Characteristics

A surprising finding was that compositions according to the invention have better flow characteristics than polyester per se. At 190° C., the Bionolle #1903 polyester has an MFI of 4.5. Tests conducted on the 60B/40PF composition gave an MFI of 4.8 at 160° C. The enhanced MFI is advantageous when a composition is to be used in an injection moulding process.

d) Combustibility

A fire test was conducted by Queensland Fire & Rescue Authority at the Whyte Island Academy, Queensland. A 200 mm diameter dish with 13 mm thick walls formed from a composition of 50% Bionolle/50% pecan nut filler was subjected to the test. The test comprised placing the article on a bench in a test room which was subjected to a fully involved, non-controlled fire. The temperature during the test was at least 300° C.

The area of the bench occupied by the article was not burned to any greater degree than the rest of the bench. There was evidence of liquid running from the article but there was no indication that this liquid contributed to the fire.

Applied flame testing of the article indicated that although the material will burn if sufficient heat is applied, the flames will self-extinguish. The applied flame testing also indicated that there is insignificant smoke when the material is burning.

It will be appreciated by those of skill in the art that many changes can be made to the composition and the process of preparing product therefrom exemplified above without departing from the broad ambit and scope of the invention.

The term "comprise" and variants thereof such as "comprising" and "comprised" are used herein to denote the inclusion of a stated integer or integers, unless in the context of usage an exclusive interpretation of a term is required.

What is claimed is:

1. A composition for forming a wood substitute, the composition comprising 30 to 70% (volume by volume) of a high molecular weight aliphatic polyester and the balance a comminuted cellulose-containing plant material, wherein said aliphatic polyester comprises 1,4-butanediol condensed with adipic acid and/or succinic acid and said comminuted cellulose-containing plant material is a dry material and said comminuted cellulose-containing plant material is a dry material.

2. The composition according to claim 1, wherein said aliphatic polyester has a weight average molecular weight (Mw) in the range of 40,000 to 300,000.

3. The composition according to claim 1, wherein said aliphatic polyester is poly (butylene) succinate.

4. The composition according to claim 1, wherein said aliphatic polyester is poly (butylene) succinate/adipate.

5. The composition according to claim 1, wherein said cellulose-containing plant material is from the epidermis or cortex of a plant, or is seed coat material.

6. The composition according to claim 5, wherein said cellulose-containing plant material is nutshell material.

7. The composition according to claim 6, wherein said nutshell is pecan nutshell.

8. The composition according to claim 5, wherein said cellulose-containing plant material is saw dust, milling waste or sugar cane bagasse.

9. The composition according to claim 1, wherein particles of said comminuted cellulose-containing plant material have a size range of a fine powder up to about 5 mm.

10. The composition according to claim 1, wherein said composition further includes a colouring agent and/or a weight minimisation agent.

11. The composition according to claim 10, wherein said colouring agent is selected from fly-ash, talc and colouring pigments.

12. The composition according to claim 10, wherein said weight minimisation agent is a micro-balloon, a hollow glass sphere or a foaming agent.

13. The composition according to claim 1, wherein said composition further includes a plant growth compound and/or plant fibre.

14. The composition according to claim 13, wherein said plant growth compound is manure and/or fertiliser.

15. A process for producing a wood substitute, the process comprising the steps of:

a) heating a composition comprising 30 to 70% (volume by volume) of a high molecular weight aliphatic polyester and the balance a comminuted cellulose-containing plant material at a temperature of 110 to 180° C. to provide a flowable material, wherein said aliphatic polyester comprises 1,4-butanediol condensed with adipic acid and/or succinic acid and said comminuted cellulose-containing plant material is a dry material;

b) forming said heated material from step (a) into a desired product; and c) allowing said product to cool to at least ambient temperature.

16. The process according to claim 15, wherein said forming into a desired product in step (b) is by compression, vacuum, injection or rotation moulding.

17. The process according to claim 15, wherein said forming into a desired product in step (b) is by extrusion.

18. The process according to claim 15, wherein said cooling in step (c) is mechanically aided.

19. A wood substitute formed from the composition according to claim 1.

20. A wood substitute article prepared by the process according to claim 15.

21. A composition for forming a wood substitute, the composition comprising 50 to 70% (volume by volume) of poly (butylene) succinate having a weight average molecular weight (Mw) in the range of 40,000 to 300,000 as the sole binder substance and the balance is a comminuted cellulose-containing plant material.

22. A composition according to claim 21, wherein said comminuted cellulose-containing plant material is comminuted pecan nutshell.

* * * * *